Dec. 6, 1949 G. R. ASCHAUER 2,490,398
AXIALLY ENGAGING CLUTCH
Filed Oct. 31, 1945 3 Sheets-Sheet 1
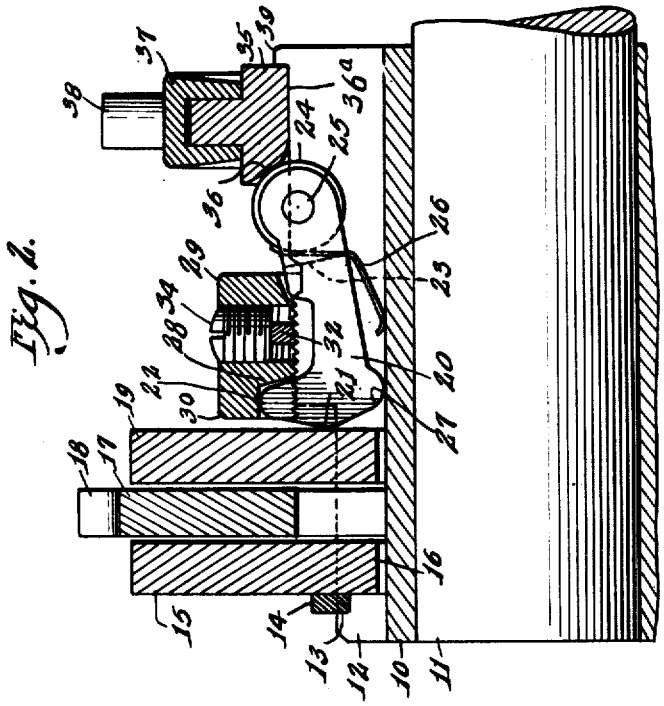
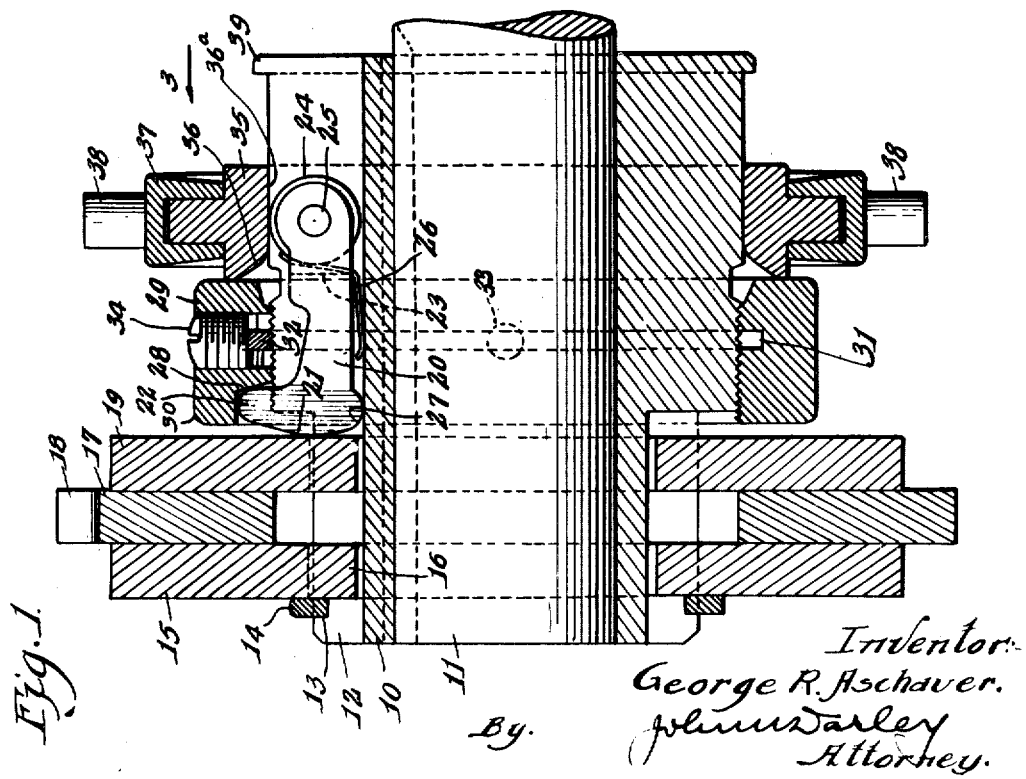
Inventor:
George R. Aschauer.
By John Darley
Attorney.

Dec. 6, 1949   G. R. ASCHAUER   2,490,398
AXIALLY ENGAGING CLUTCH
Filed Oct. 31, 1945   3 Sheets-Sheet 2
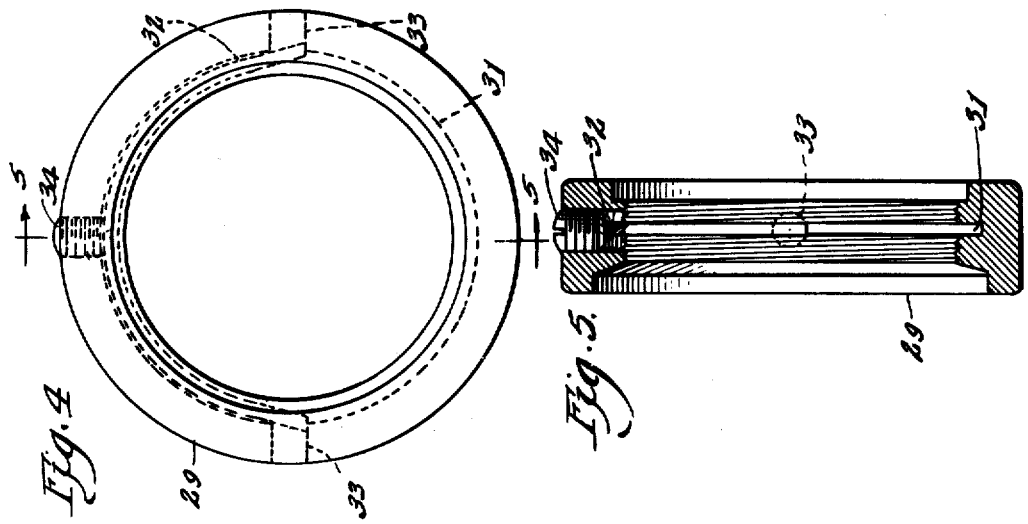
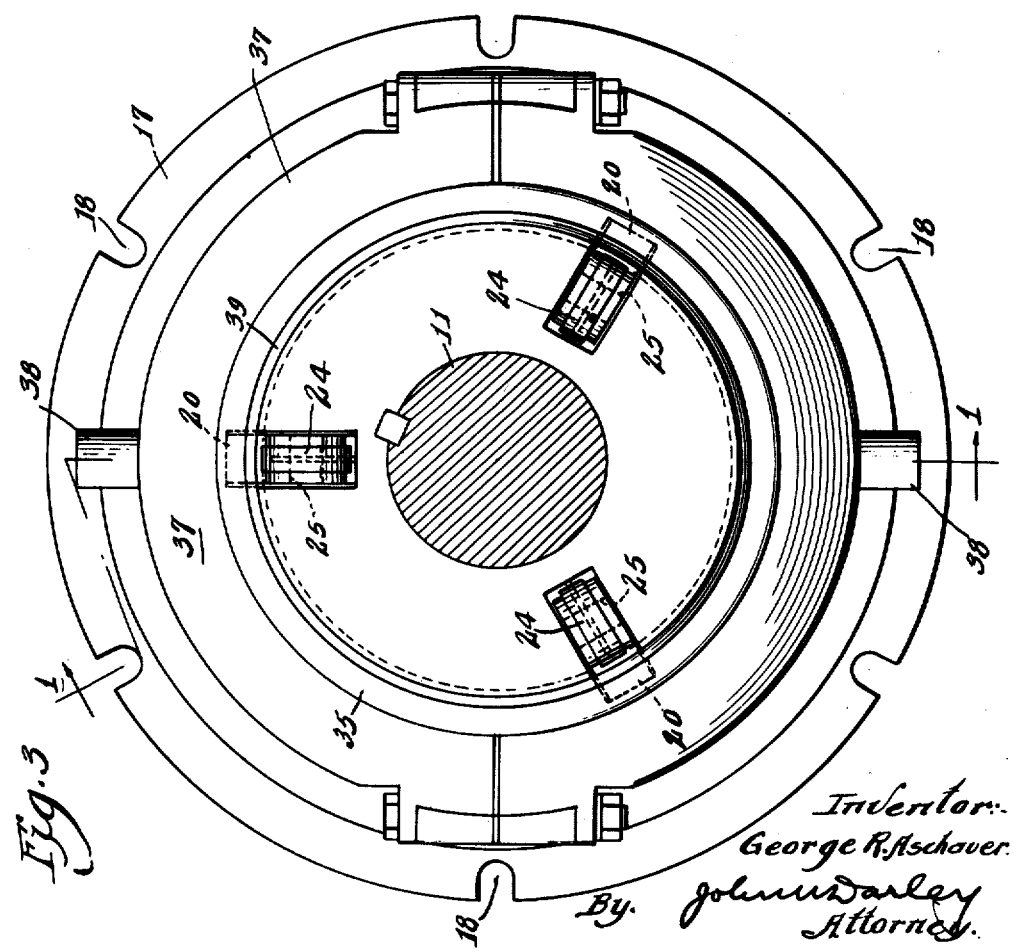
Inventor:
George R. Aschauer
By John W. Darley
Attorney.

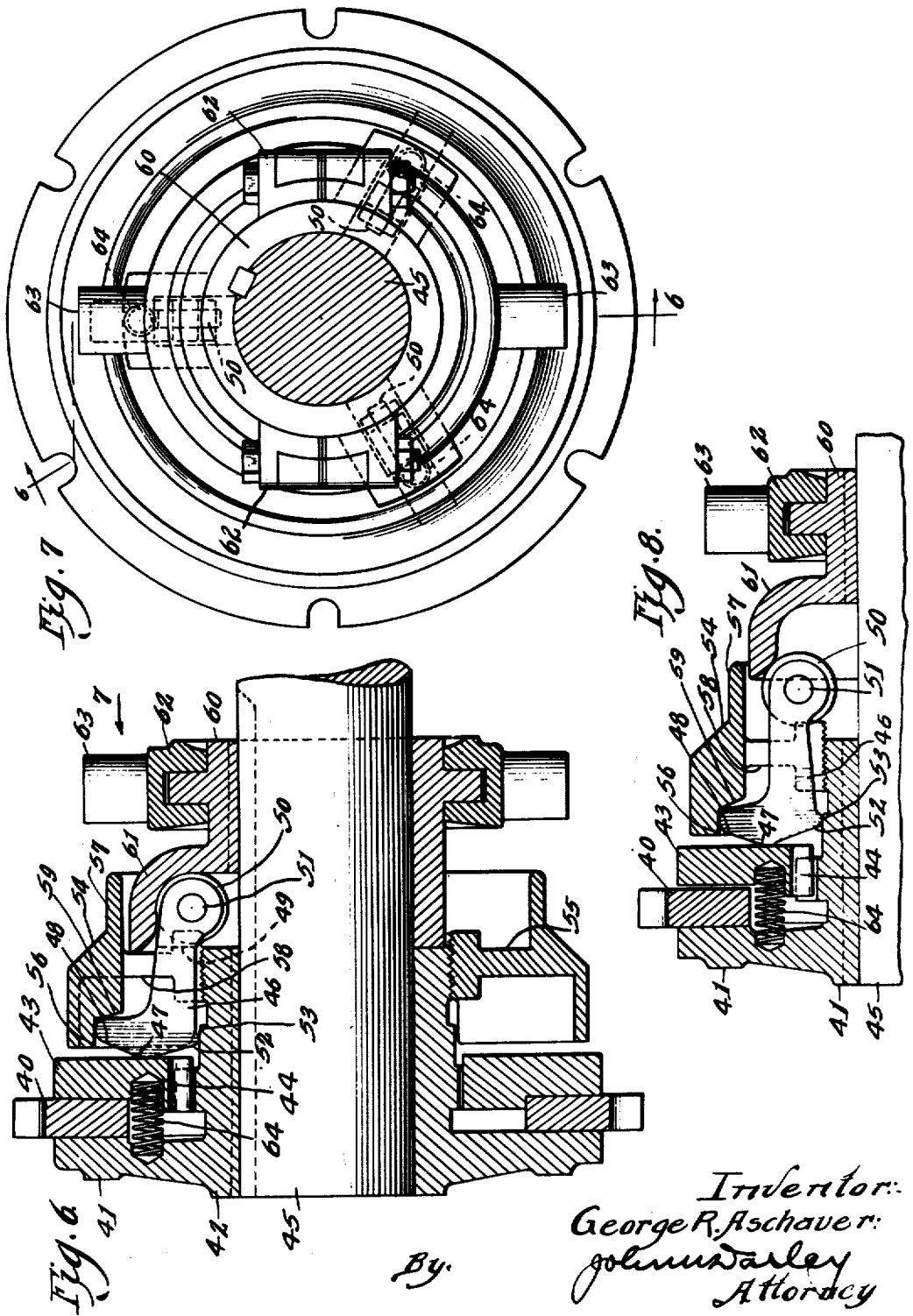

Patented Dec. 6, 1949

2,490,398

UNITED STATES PATENT OFFICE 2,490,398

AXIALLY ENGAGING CLUTCH

George R. Aschauer, Racine, Wis., assignor to Twin Disc Clutch Company, Racine, Wis., a corporation of Wisconsin Application October 31, 1945, Serial No. 625,714

3 Claims. (Cl. 192—69)

My invention relates to clutches and more particularly to a device of this type which is mechanically or positively actuated into driving position, as contrasted with clutches of the spring loaded type.

One object of my invention is to devise a clutch of the plate type having operating mechanism for mechanically engaging the same which tends to release under the impulse of centrifugal force so that the clutch runs free in the disengaged position.

A further object is the provision of an operating mechanism having levers which are characterized by a floating or wandering action, as compared with the usual fixed pivot construction, thus enabling the levers to position themselves for the easiest operation possible.

A further object is to provide a clutch of the type indicated which is characterized by compactness, a high degree of efficiency, a capacity for being embodied in various specific adaptations to meet different operating conditions, and which is susceptible of rapid production due to the fact that numerous parts are either simple castings, or capable of automatic manufacture.

Additional objects are the securement in a compact clutch structure of an adequate mechanical advantage in the operating mechanism for insuring the application of the required clamping pressure, ease of adjustment as the plates wear, and a positive release of the clutch levers during disengagement.

A further object is to devise a clutch having a novel arrangement for locking the adjusting ring in adjusted position.

These and further objects of the invention will be set forth in the following specification, reference being had to the accompanying drawings, and the novel means by which said objects are effectuated will be definitely pointed out in the claims.

In the drawings:

Fig. 1 is a sectional elevation of one form of the improved clutch in engaged position as taken along the line 1—1 in Fig. 3.

Fig. 2 is a fragmentary, sectional elevation of the clutch similar to Fig. 1 showing the same in release position.

Fig. 3 is an end view of the clutch looking in the direction of the arrow 3 in Fig. 1.

Fig. 4 is an end elevation of the adjusting ring shown in Fig. 1.

Fig. 5 is a section along the line 5—5 in Fig. 4.

Fig. 6 is a sectional elevation of a modified form of clutch in engaged position as taken along the line 6—6 in Fig. 7.

Fig. 7 is an end view of the modified clutch looking in the direction of the arrow 7 in Fig. 6.

Fig. 8 is a fragmentary sectional elevation of the modified clutch in release position.

Referring to Figs. 1 to 5, inclusive, the numeral 10 designates a hub which is keyed to a shaft 11 and which, in the present instance, will be regarded as the driven member of the clutch, although the construction is not limited in this respect, since the hub 10 may be utilized as the driving member without interfering with the efficient and positive operation of the clutch. The periphery of the hub is provided with a plurality of keyways 12 that are preferably circumferentially equispaced and also at the left end, as viewed in Fig. 1, with an annular channel 13 in which is seated a split ring 14 that constitutes an abutment for a clamping plate 15. The plate 15 is provided with teeth 16 that fit into the keyways 12 so that the plate rotates with the hub 10, but may shift endwise thereof.

The plate 15 frictionally engages with one side of a driving plate 17 that is peripherally toothed at 18 for driven engagement with an internally toothed, driving ring (not shown) that may be secured to a flywheel or other power source. The driving plate 17 may be molded from a frictional material, but may also be arranged as a metallic plate having frictional facings on its opposite sides. The opposite surface of the plate 17 is engaged by a second clamping plate 19 that is formed like the plate 15 and has the same operative relation to the hub 10.

One novel feature of this design resides in the operating mechanism which comprises a plurality of clutch levers 20, each of which is mounted in one of the keyways 12. Each lever, at the end adjacent the clamping plate 19, has its end face shaped with a ridge-like formation 21 and is further provided with a radially outward, extending nose 22, while the opposite end is bifurcated at 23 to receive a roller 24 mounted on a pintle 25 bridged between the jaws of the bifurcation. An L-shaped spring 26 has its wings respectively bearing against the floor of the associated keyway and the surface of the roller 24 between the jaws of the bifurcated end of the lever and always tends to move the lever to the release position shown in Fig. 2. Between its ends, the lever is substantially straight and has a free, sliding fit in the associated keyway and its width radially of the clutch is such that, except for the nose 22, each lever is generally housed in one of the keyways. At the nose end, each lever is further provided with a guide boss 27 which rides on the floor of the cooperating keyway during its movements.

In the engaged position shown in Fig. 1, the ridges 21 bear against the clamping plate 19 while the noses 22 bear against the recessed face 28 of an adjusting ring 29 that is threaded on the hub 10. The forming of the face 28 creates an annular flange 30 on the adjusting ring that extends towards the plate 19 in partially enclosing relation to the outer ends of the noses and assists in retaining the levers 20 in the keyways 12 against centrifugal movement. Further, this construction, in conjunction with the plate 19, limits endwise movements of the levers, but, within these limits, the levers are capable of moving with a free, rocking action relative to the ring 29 and plate 19 since they are not restrained by any fixed pivot connection to the hub 10.

In order to maintain the ring 29 in adjusted position, it is provided with an internal, annular groove 31 (see Figs. 1, 4 and 5) and positioned in this groove is a semi-circular strip 32 whose ends are slightly spread and abut the walls of a pair of diametrically opposed holes 33—33 formed in the ring, these walls serving as ledges for the ends of the strip 32. The major portion of the length of the strip 32 is forced into locking contact with the threaded part of the hub 10 by a set screw 34 positioned radially of the ring 29, the strip bridging between its ends and having sufficient resiliency to free itself from the threads when the screw 34 is retracted preliminary to moving the ring to a new position. The strip 32 sufficiently distributes the pressure of the set screw 34 over the coacting threads so that the latter are not injured, while the holes 33 may be engaged by any tool for rotating the adjusting ring.

As a further means for restraining the levers against outward movement and for actuating the levers, a collar 35 encircles the hub 10, including the levers 20, and the inner periphery of the collar is shaped as a flat, annular surface 36a which provides a bearing on the hub. The end face of the collar 35 adjacent the ring 29 is sloped or inclined outwardly as at 36 to facilitate engagement with the rollers 24 as hereinafter described. Endwise shifting of the collar along the hub is secured by means of ring segments 37—37 (see Figs. 1 and 3) which are bolted together and each of which carries a trunnion 38 which is engaged in the usual manner by a shifting fork (not shown).

As illustrated in Fig. 1, the clutch is in driving position. The adjusting ring flange 30 which partially encloses the lever noses 22 and the collar 35 which engages the rollers 24 restrain the levers against outward movement, while the collar additionally maintains the levers in the clamping positions shown, i. e., the ridges 21 bearing against the clamping plate 19 and the noses 22 fulcruming against the face 28 of the adjusting ring which acts as an abutment for the adjacent ends of the levers.

To release the clutch, the collar 35 is moved towards the right, as viewed in Fig. 1, to the position shown in Fig. 2, whereupon the levers rock and each assumes the position shown in the last figure, the releasing action of the levers being assisted by the springs 26. The lever ridges 21 are freed from the clamping plate so that the latter separates from the driving plate 17. The releasing movement of the collar is limited by the annular stop 39 provided on the hub 10.

In engaging the clutch, the collar 35 is moved towards the left from the position shown in Fig. 2, thus engaging the rollers 24 with the inclined end face 36 of the collar 35. The levers are accordingly rocked inwardly of the clutch with the noses 22 fulcruming on the adjusting ring face 28 and the lever ridges 21 bearing against and moving the clamping plate 19 to gripping position. As the driving plate 17 wears, the required adjustment can be easily effected by the ring 29 which is moved to maintain the desired fulcruming relation with the lever noses 22.

Due to the fact that the levers 20 can move freely in the keyways 12, they readily accommodate themselves to the several positions required in the operation of the clutch, thus avoiding any undue strain on the several parts. The construction is very compact and the lever arm relation in each lever between the ridge 21 and the nose 22 and the roller 24 provides a high mechanical advantage in operating the clutch.

In Figs. 6, 7 and 8 is illustrated a modified form of clutch which essentially differentiates from that described above in that the shifting collar is not mounted on the hub, but on the shaft to which the hub is secured. In this design, the driving plate 40 is in the driving position of the clutch gripped between a flange 41 that is integral with a hub 42 and an internally toothed pressure plate 43 that is axially movable relative to and drivably engaged with a peripherally toothed portion 44 on the hub. The hub is keyed to a shaft 45.

The operating mechanism comprises a plurality of levers 46 spaced around the hub, each being generally similar to the lever 20 and having its end face adjacent the pressure plate 43 shaped with a ridge-like formation 47 and is further provided with a radially outward, extending nose 48, while the opposite end is bifurcated at 49 to receive a roller 50 mounted on a pintle 51. The lever is further provided with a guide boss 52 which rides on a smooth, peripheral shoulder 53 on the hub.

An adjusting ring 54 of substantially T-section has the inner face of the radial portion 55 of the section threaded on the hub 42 while the wings of the section form oppositely extending, circumferential flanges 56 and 57, the former flange being directed towards the pressure plate 43. These adjusting ring flanges are disposed in enclosing relation to the levers 46 and the radial portion 55 of the ring is slotted in appropriate locations, as at 58, and a lever 46 is freely movable radially in each of these slots but moves rotarily with the hub.

In the engaged position shown in Fig. 6, the ridges 47 bear against the pressure plate 43 while the noses 48 bear against a face 59 that is recessed in the end of the ring flange 56. Due to the enclosing relation of the ring flange 56 to the noses 48, the levers are held against centrifugal movement, while the face 59 in conjunction with the pressure plate 43 limit endwise movements of the levers. However, within these limits, the levers are capable of a free, rocking movement relative to the ring 54 and pressure plate 43 since they do not have any fixed pivot connection to the hub 42.

The levers 46 are actuated by a collar 60 that is keyed to and slidable along the shaft 45 and is preferably integrally formed with a cup-shaped flange 61 whose outside diameter is such that it may be moved in telescopic relation to the flange 57 on the adjusting ring, while its inside diameter is arranged so that the flange 61 can ride over the rollers 50 when in the released position shown in Fig. 8 and rock them inwardly of the clutch. Endwise shifting of the collar 60 along the shaft is secured by means of ring segments 62—62 which are bolted together and each of which carries a trunnion 63 which is engaged in the usual manner by a shifting fork (not shown).

The general operation of the clutch shown in Fig. 6 is identical with that illustrated in Fig. 1, the levers 46 fulcruming on the adjusting ring with the ridges 47 thereof pressing against the pressure plate 43 when the clutch is engaged. During release, the collar 60 is moved towards the right to the approximate position shown in Fig. 8, whereupon the levers 46 rock outwardly under the impulse of centrifugal force and relieve the pressure plate. This releasing action may be assisted by a plurality of helical springs 64 which are equispaced circumferentially of the clutch and each of which seats in appropriate pockets provided in the hub flange 41 and the pressure plate 43. During all movements of the levers, it will be noted that they are substantially housed within the adjusting ring 54 which additionally insures their rotation with the hub. As the friction elements of the clutch wear, the necessary take-up to maintain the operative relation of the levers to the pressure plate 43 and adjusting ring 54 is effected by rotating the ring. The ring may be held in adjusted position by any of the expedients commonly employed for this purpose in clutches, such as, for example, the spring actuated, locking pin shown in United States Letters Patent No. 1,685,502.

One of the most important features of both modifications is the relatively low cost of construction. In both types, the levers may be made from forgings or castings; the clamping plates in the Fig. 1 modification are duplicates, while the adjusting rings, hubs and shifting collars in both modifications are susceptible of automatic manufacture.

I claim:

1. In a clutch, the combination of a friction plate, a clamping plate arranged to engage the friction plate, a hub to which the clamping plate is connected for rotation therewith and for axial movement relative thereto, an adjusting ring mounted on and encircling the hub and having a plurality of circumferentially spaced slots, clutch levers disposed around the hub and free of any connection thereto, and bodily movable relative to the ring each lever extending through and fitting a slot whereby the levers rotate with the ring, and means movable towards the clamping plate for actuating the levers to engage the clutch, the ring being positioned between the clamping plate and actuating means and one end of each lever fulcruming against the ring and a lever part adjacent thereto pressing against the clamping plate.

2. In a clutch, the combination of a friction plate, a clamping plate arranged to engage the friction plate, a hub to which the clamping plate is connected for rotation therewith and for axial movement relative thereto, an adjusting ring mounted on and encircling the hub and having a plurality of circumferentially spaced slots, clutch levers disposed around the hub and free of any connection thereto, and bodily movable relative to the ring each lever extending through and fitting a slot whereby the levers rotate with the ring, and means slidable towards the clamping plate for actuating the levers to engage the clutch, the ring being positioned between the clamping plate and actuating means and one end of each lever fulcruming against the ring and a lever part adjacent thereto pressing against the clamping plate.

3. In a clutch, the combination of a friction plate, a clamping plate arranged to engage the friction plate, a shaft, a hub secured to the shaft, the clamping plate being connected to the hub for rotation therewith and for axial movement relative thereto, an adjusting ring mounted on and encircling the hub and having a plurality of circumferentially spaced slots, clutch levers disposed around the hub and free of any connection thereto and bodily movable relative to the ring each lever extending through and fitting a slot whereby the levers rotate with the ring, and means slidable on the shaft towards the clamping plate for actuating the levers to engage the clutch, the ring being positioned between the clamping plate and actuating means and one end of each lever fulcruming against the ring and a lever part adjacent thereto pressing against the clamping plate.

GEORGE R. ASCHAUER.

REFERENCES CITED

The following references are of record in the file of this patent:

UNITED STATES PATENTS

| Number | Name | Date |
|---|---|---|
| 728,692 | Fales | May 19, 1903 |
| 1,198,052 | Porter | Sept. 12, 1916 |
| 2,070,065 | Pearmain | Feb. 9, 1937 |
| 2,217,357 | Coe | Oct. 8, 1940 |
| 2,330,856 | Adamson | Oct. 5, 1943 |

FOREIGN PATENTS

| Number | Country | Date |
|---|---|---|
| 493,214 | Great Britain | Oct. 5, 1938 |